United States Patent
Zarringhalam et al.

(10) Patent No.: US 11,634,128 B2
(45) Date of Patent: Apr. 25, 2023

(54) TRAILER LANE DEPARTURE WARNING AND LANE KEEP ASSIST

(71) Applicant: GM GLOBAL TECHNOLOGY OPERATIONS LLC, Detroit, MI (US)

(72) Inventors: Reza Zarringhalam, Whitby (CA); Amir Takhmar, Toronto (CA); Carlos E. Arreaza, Oakville (CA); Shiv G. Patel, Toronto (CA); Mohammed Raju Hossain, Oshawa (CA); Dorothy Lui, West North York (CA); Kibrom Yohannes, Toronto (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 151 days.

(21) Appl. No.: 17/195,347

(22) Filed: Mar. 8, 2021

(65) Prior Publication Data
US 2022/0281448 A1 Sep. 8, 2022

(51) Int. Cl.
*B60W 30/12* (2020.01)
*B60W 10/18* (2012.01)
(Continued)

(52) U.S. Cl.
CPC ............ *B60W 30/12* (2013.01); *B60W 10/18* (2013.01); *B60W 10/20* (2013.01); *B60W 50/14* (2013.01);
(Continued)

(58) Field of Classification Search
CPC ...... B60W 30/12; B60W 10/18; B60W 10/20; B60W 50/14; B60W 2552/53; G06V 20/588
See application file for complete search history.

(56) References Cited

U.S. PATENT DOCUMENTS 8,428,821 B2 * 4/2013 Nilsson .................. B62D 6/003
701/41
9,428,188 B2 * 8/2016 Schwindt .............. B60W 30/12
(Continued)

FOREIGN PATENT DOCUMENTS

CN 101778753 A * 7/2010 ........... B62D 15/025
DE 102018004108 A1 * 10/2018
DE 102017113469 A1 * 12/2018 ............... B60R 1/00

OTHER PUBLICATIONS

CN-101778753-A Translation (Year: 2010).*
DE-102018004108-A1 Translation (Year: 2018).*
DE-102017113469-A1 (Year: 2018).*

*Primary Examiner* — Frederick M Brushaber
(74) *Attorney, Agent, or Firm* — Lorenz & Kopf LLP

(57) ABSTRACT

Methods and systems are provided for a vehicle towing a trailer within a lane of a roadway that include: reconstructing, via a processor onboard the vehicle, lane markings for the trailer using lane markers as sensed via camera data; transforming the reconstructed lane markings, using additional sensor data, to a perspective of the trailer; localizing the trailer within the transformed lane markers using historical camera lane marking information, articulated vehicle dynamics, hitch angle, and trailer dimensions, without needing to add additional trailer lane sensing cameras to the trailer; calculating a time to lane crossing (T-TTLC) value for the trailer and vehicle; generating candidate blended paths of the trailer and the vehicle with a centerline of the lane of the roadway; and controlling operation of the vehicle, the trailer, or both, via instructions provided by the processor to keep the vehicle, the trailer, or both within a lane of travel.

20 Claims, 9 Drawing Sheets

(51) Int. Cl.
*B60W 10/20* (2006.01)
*B60W 50/14* (2020.01)
*G06V 20/56* (2022.01)

(52) U.S. Cl.
CPC ....... *G06V 20/588* (2022.01); *B60W 2552/53* (2020.02)

(56) References Cited

U.S. PATENT DOCUMENTS

| | | | |
|---|---|---|---|
| 2016/0325682 A1* | 11/2016 | Gupta | G06V 10/147 |
| 2017/0073004 A1* | 3/2017 | Shepard | B62D 15/028 |
| 2018/0037261 A1* | 2/2018 | Shepard | B62D 13/06 |
| 2022/0348227 A1* | 11/2022 | Foster | G06V 20/58 |

* cited by examiner

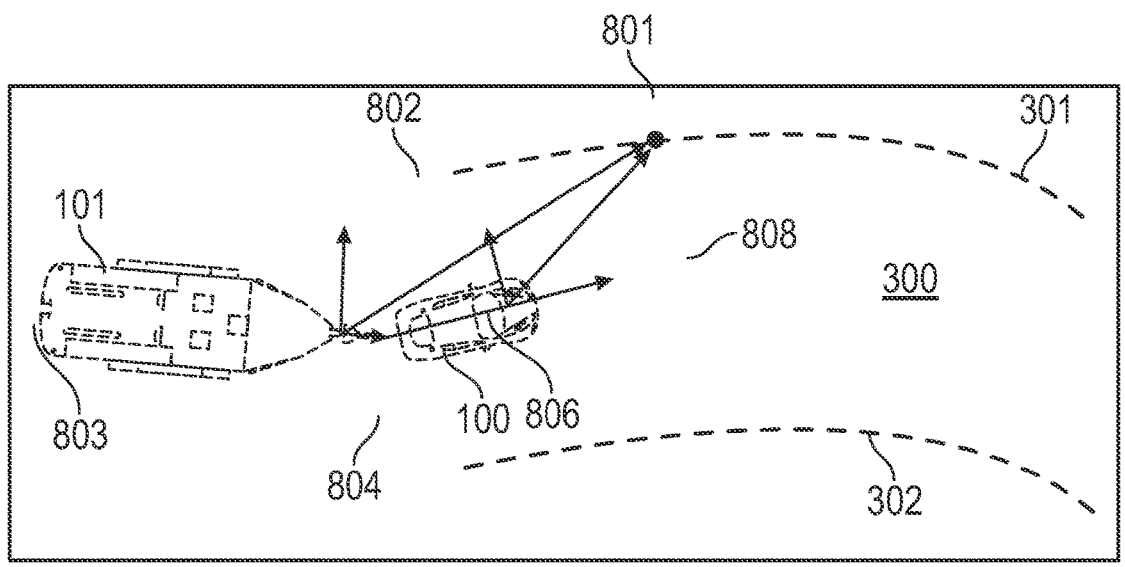
FIG. 8
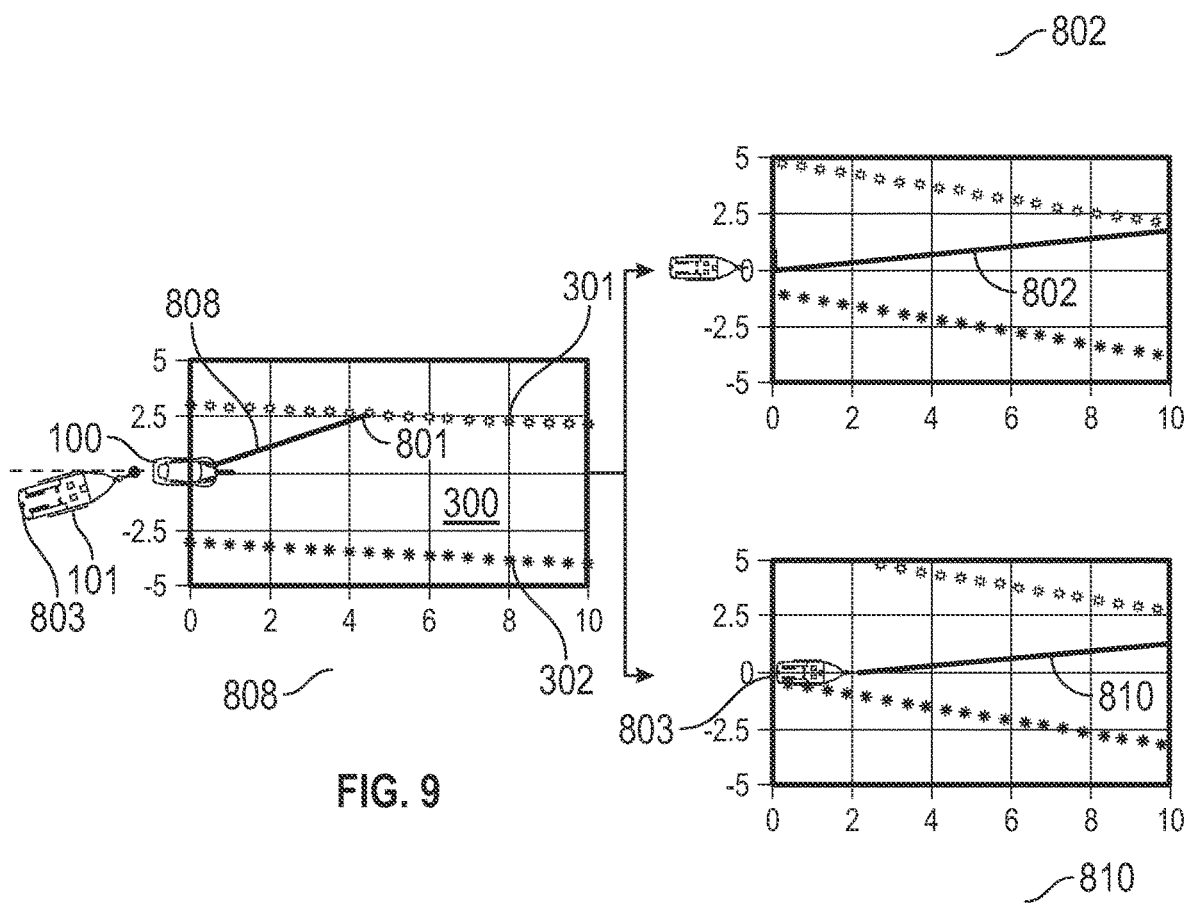
FIG. 9
FIG. 10

TRAILER LANE DEPARTURE WARNING AND LANE KEEP ASSIST

INTRODUCTION

The technical field generally relates to vehicles and, more specifically, to methods and systems for controlling vehicles with trailers and maintaining them in their lane.

Certain vehicles today are equipped to tow a trailer during travel. However, such existing vehicles may not always provide optimal control of the vehicle and trailer within an appropriate lane in certain situations.

Accordingly, it is desirable to provide improved methods and systems for controlling vehicles and trailers in an appropriate lane. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is provided that includes: obtaining sensor data from one or more sensors onboard a vehicle that is towing a trailer within a lane of a roadway, the lane having one or more lane markers; calculating, via a processor onboard the vehicle, a time to lane crossing (TTLC) value for the vehicle, estimating a time to lane crossing for the trailer (T-TTLC), using the sensor data from the one or more sensors onboard the vehicle; and controlling operation of the vehicle, the trailer, or both, via instructions provided by the processor, based on the calculated TTLC and T-TTLC values.

Also in an exemplary embodiment, the step of obtaining the sensor data includes obtaining camera data from one or more cameras onboard the vehicle; and the step of calculating the T-TTLC value includes calculating, via the processor, the T-TTLC value using the camera data.

Also in an exemplary embodiment, the step of calculating the T-TTLC value includes: reconstructing, via the processor, lane markings for the trailer using lane markers sensed via the camera data; transforming the reconstructed lane markings, using additional sensor data, to a perspective of the trailer; and localizing the trailer within the transformed lane markings.

Also in an exemplary embodiment, the step of localizing the trailer comprises localizing the trailer within the transformed lane markers using historical camera lane marking information, articulated vehicle dynamics, hitch angle, and trailer dimensions, without needing to add additional trailer lane sensing cameras to the trailer.

Also in an exemplary embodiment, the method further includes: calculating, via the processor, a time to lane crossing (TTLC) value for the vehicle, using the sensor data from the one or more sensors onboard the vehicle; wherein the step of controlling operation of the vehicle, the trailer, or both includes controlling operation of the vehicle, the trailer, or both, via instructions provided by the processor, based on both the calculated T-TTLC value and the calculated TTLC value.

Also in an exemplary embodiment, the step of controlling operation of the vehicle, the trailer, or both includes controlling operation of both the vehicle and the trailer, via instructions provided by the processor, based on both the calculated T-TTLC value and the calculated TTLC value.

Also in an exemplary embodiment, the step of controlling the vehicle and trailer further includes: blending, via the processor, blended paths of the trailer and the vehicle with a centerline of the lane of the roadway in which the vehicle and the trailer are travelling.

Also in an exemplary embodiment, the step of controlling operation of the vehicle, the trailer, or both, includes providing corrective steering, corrective braking, or both, via instructions provided by the processor, to keep the vehicle, the trailer, or both within a lane of travel, based on the T-TTLC value.

In another exemplary embodiment, a system is provided that includes: one or more sensors configured to at least facilitate from onboard a vehicle that is towing a trailer within a lane of a roadway, the lane having one or more lane markers; and a processor onboard the vehicle and configured to at least facilitate: calculating a time to lane crossing (T-TTLC) value for the trailer, using the sensor data from the one or more sensors onboard the vehicle; and controlling operation of the vehicle, the trailer, or both based on the calculated T-TTLC value.

Also in an exemplary embodiment, the one or more sensors include one or more cameras configured to generate camera data; and the processor is further configured to at least facilitate calculating the T-TTLC value using the camera data.

Also in an exemplary embodiment, the processor is further configured to at least facilitate: reconstructing lane markings for the trailer using lane markers sensed via the camera data; transforming the reconstructed lane markings, using additional sensor data, to a perspective of the trailer; and localizing the trailer within the transformed lane markings.

Also in an exemplary embodiment, the processor is further configured to at least facilitate controlling the vehicle by blending paths of the trailer and the vehicle with a centerline of the lane of the roadway in which the vehicle and the trailer are travelling.

Also in an exemplary embodiment, the processor is further configured to at least facilitate: calculating a time to lane crossing (TTLC) value for the vehicle, using the sensor data from the one or more sensors onboard the vehicle; and controlling operation of the vehicle, the trailer, or both, based on both the calculated T-TTLC value and the calculated TTLC value.

Also in an exemplary embodiment, the processor is further configured to at least facilitate controlling operation of both the vehicle and the trailer based on both the calculated T-TTLC value and the calculated TTLC value.

Also in an exemplary embodiment, the processor is configured to at least facilitate providing corrective steering, corrective braking, or both, to keep the vehicle, the trailer, or both within a lane of travel, based on the T-TTLC value.

In accordance with another exemplary embodiment, a vehicle is provided that is configured to tow a trailer within a lane of a roadway, the lane having one or more lane markers, the vehicle including: a body; a propulsion system configured to generate movement of the body; one or more sensors onboard the vehicle and configured to at least facilitate obtaining sensor data; and a processor onboard the vehicle and configured to at least facilitate: calculating a time to lane crossing (T-TTLC) value for the trailer, using the sensor data from the one or more sensors onboard the vehicle; and controlling operation of the vehicle, the trailer, or both based on the calculated T-TTLC value.

Also in an exemplary embodiment: the one or more sensors comprise one or more cameras configured to generate camera data; and the processor is further configured to at least facilitate calculating the T-TTLC value using the camera data, at least in part by: reconstructing lane markings for the trailer using lane markers sensed via the camera data, generated reconstructed lane markings; transforming the reconstructed lane markings, using additional sensor data, to a perspective of the trailer; and localizing the trailer within the transformed lane markings.

DESCRIPTION OF THE DRAWINGS

The present disclosure will hereinafter be described in conjunction with the following drawing figures, wherein like numerals denote like elements, and wherein:

FIGS. 8-15 illustrate certain implementations of the process of FIG. 5, in accordance with exemplary embodiments.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
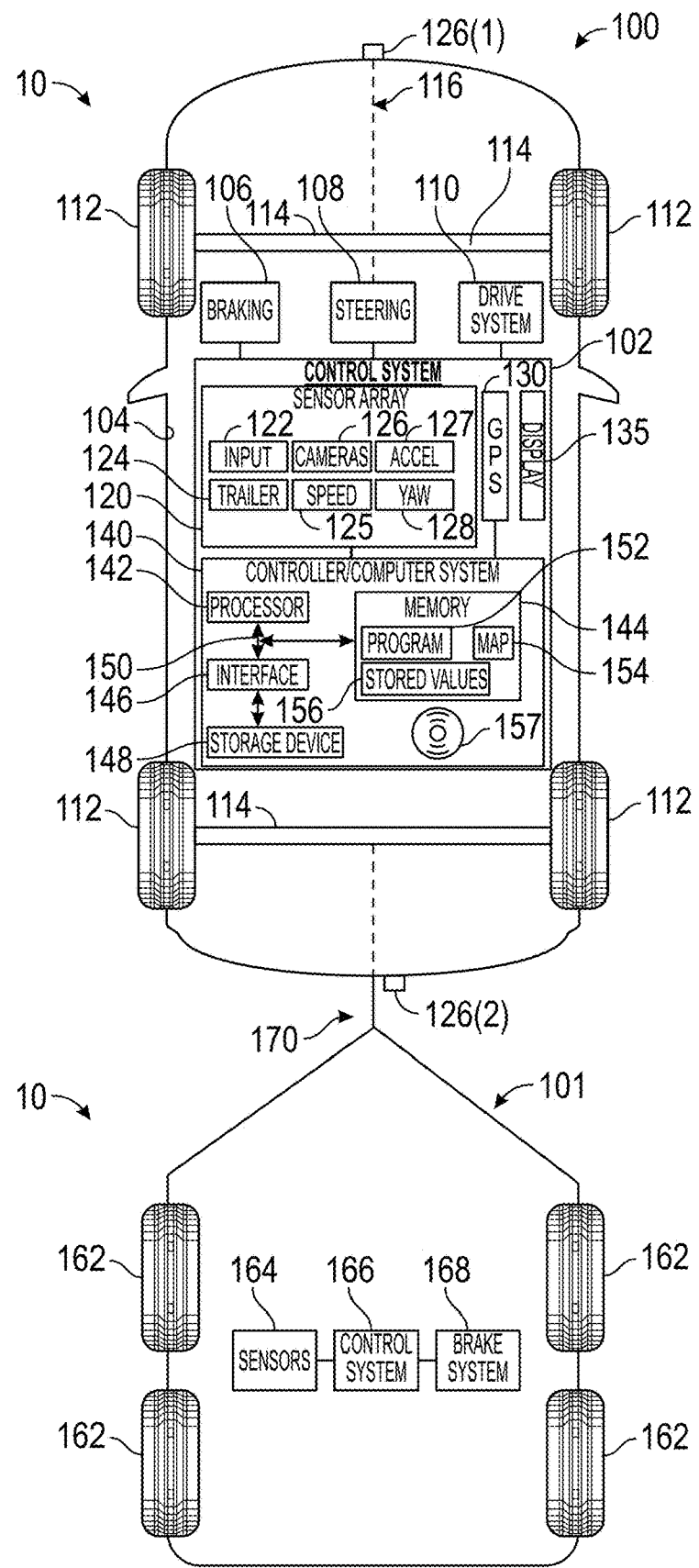
FIG. 1 is a functional block diagram of a vehicle/trailer system that includes a vehicle that is towing a trailer during travel, and in which the vehicle that includes a control system for controlling the vehicle and trailer during travel with respect to an appropriate lane, in accordance with exemplary embodiments.

FIG. 1 illustrates a travel system 10 (also referred to as a "system" or "vehicle/trailer system") 10, according to an exemplary embodiment. As depicted in FIG. 1, the travel system 10 includes a vehicle 100 and a trailer 101. In various embodiments, the vehicle 100 is coupled and connected to the trailer 101 via a connection apparatus 170, and is configured to tow a trailer 101. In certain embodiments, the connection apparatus 170 comprises a hitch. In certain other embodiments, the connection apparatus 170 comprises one or more other types of apparatus system, such as a gooseneck for a fifth wheel trailer, and so on.

As described in greater detail further below, the vehicle 100 includes a control system 102 for controlling operation and movement of the travel system 10, including maintaining the vehicle 100 and the trailer 101 within an appropriate lane of travel, in accordance with an exemplary embodiment.

In various embodiments, the vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

The vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. The drive system 110 preferably comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 112 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, the vehicle also includes a braking system 106 and a steering system 108 in various embodiments. In exemplary embodiments, the braking system 106 controls braking of the vehicle 100 using braking components that are controlled via inputs provided by a driver (e.g., via a braking pedal in certain embodiments) and/or automatically via the control system 102. Also in exemplary embodiments, the steering system 108 controls steering of the vehicle 100 via steering components (e.g., a steering column coupled to the axles 114 and/or the wheels 112) that are controlled via inputs provided by a driver (e.g., via a steering wheel in certain embodiments) and/or automatically via the control system 102.

In the embodiment depicted in FIG. 1, the control system 102 is coupled to the braking system 106, the steering system 108, and the drive system 110. Also as depicted in FIG. 1, in various embodiments, the control system 102 includes a sensor array 120, a location system 130, a display 135, and a controller 140.

In various embodiments, the sensor array 120 includes various sensors that obtain sensor data for maintaining movement of the vehicle 100 and the trailer 101 within an appropriate lane of travel. In the depicted embodiment, the sensor array 120 includes input sensors 122 (e.g., brake pedal sensors measuring brake inputs provided by a driver and/or touch screen sensors and/or other input sensors configured to received inputs from a driver or other user of the vehicle 10); trailer sensors 124 (e.g., configured to measure a weight of and/or other data pertaining to the trailer 101), speed sensors 125 (e.g., wheel speed sensors and/or other sensors configured to measure a speed and/or velocity of the vehicle and/or data used to calculate such speed and/or velocity), cameras 126 (e.g., including at least a front camera 126(1) and a rear camera 126(2) in certain embodiments, and configured to capture images of the lane and roadway in which the vehicle 100 is travelling, and in certain embodiments data pertaining to the trailer 101, such as a hitch angle at which the vehicle 100 is attached to the trailer 101 via the hitch (or other trailer apparatus) 170, acceleration sensors 127 (e.g., an accelerometer and/or one or more other sensors for measuring and/or determining an acceleration of the vehicle 100), and yaw sensors 128 (for measuring and/or determining a yaw rate of the vehicle 100).

Also in various embodiments, the location system 130 is configured to obtain and/or generate data as to a position and/or location in which the vehicle is located and/or is travelling. In certain embodiments, the location system 130 comprises and/or or is coupled to a satellite-based network and/or system, such as a global positioning system (GPS) and/or other satellite-based system.

In various embodiments, the display system 135 provides visual, audio, haptic, and/or other information for a driver or user of the vehicle 100 via instructions provided by the controller 140, including when the vehicle and/or trailer are expected to contact or cross lane markings for the roadway in which the system 10 is travelling.

In various embodiments, the controller 140 is coupled to the sensor array 120, the location system 130, and the display 135. Also in various embodiments, the controller 140 comprises a computer system (also referred to herein as computer system 140), and includes a processor 142, a memory 144, an interface 146, a storage device 148, and a computer bus 150. In various embodiments, the controller (or computer system) 140 controls vehicle and trailer operation, including when the vehicle and/or trailer are expected to contact or cross lane markings for the roadway in which the system 10 is travelling. In various embodiments, the controller 140 provides these and other functions in accordance with the steps of the process of FIG. 5 and implementations described further below, for example in connection with FIGS. 2-15.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process of FIG. 5 and implementations described further below, for example in connection with FIGS. 2-15.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with map data 154 (e.g., from and/or used in connection with the location system 130) and one or more stored values 156 (e.g., including, in various embodiments, threshold values for time to crossing of lane markers for the vehicle and trailer).

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120 and/or the location system 130. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process of FIG. 5 and implementations described further below, for example in connection with FIGS. 2-15. In another exemplary embodiment, the program product may be directly stored in and/or otherwise accessed by the memory 144 and/or a disk (e.g., disk 157), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

As depicted in FIG. 1, in certain embodiments, the trailer 101 also includes a plurality of wheels 162, as well as one or more sensors 164, a control system 166, and/or a braking system 168. In certain embodiments, sensors 164 of the trailer 101 may provide sensor data pertaining to the trailer 101 (e.g. a mass or weight thereof), for example similar to the trailer sensors 124 of FIG. 1. Also in certain embodiments, the control system 166 of the trailer may include a processor and provide certain functions described in connection with eh controller 140 of the vehicle 100. In addition, in certain embodiments, the braking system 168 may provide braking for the trailer 101, for example in accordance with instructions provided by the controller 140 of the vehicle 100 (and/or, in certain embodiments, via the control system 166 of the trailer 101).

Figure 2:
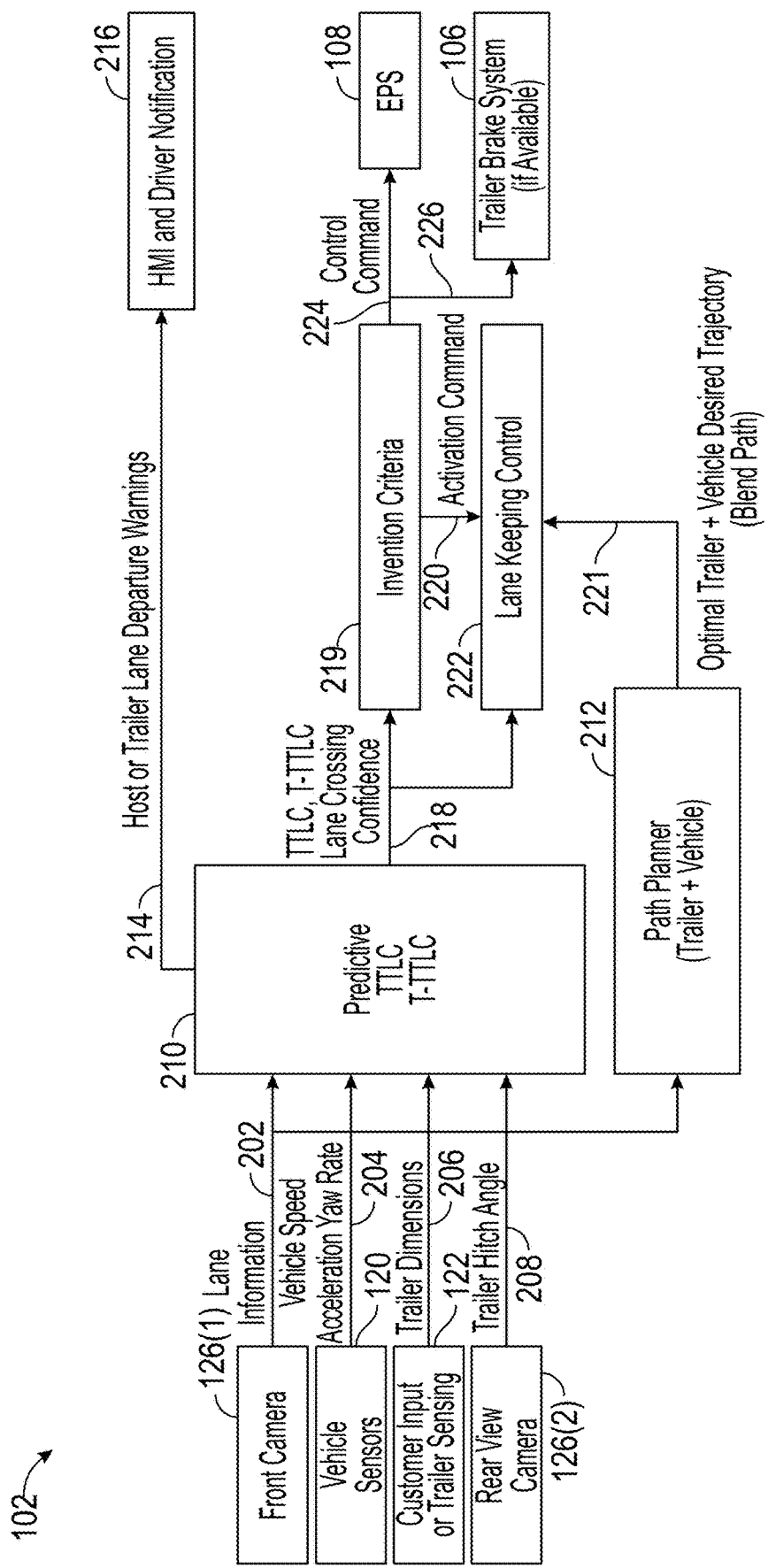
FIG. 2 is a block diagram of modules of the control system of the vehicle of FIG. 1, in accordance with exemplary embodiments.

FIG. 2 provides a functional block diagram for modules of the control system 102 of FIG. 1, in accordance with exemplary embodiments. As depicted in FIG. 2, in various embodiments, the control system 102 includes vehicle sensors of the sensor array 120 of FIG. 1, including the input sensors 122 and cameras 126 thereof, as well as other vehicle sensors (e.g., including one or more speeds sensors 125, accelerometers 127, and yaw sensors 128).

In various embodiments, lane information 202 is provided from the front camera 126 to a prediction algorithm 210 to predict time to crossing values for the vehicle 100 and the trailer 101. Also in various embodiments: acceleration, speed, and yaw rate values 204 for the vehicle 100 are similarly provided to the prediction algorithm 210 from vehicle sensors of the sensor array 120; trailer dimensions 206 are similarly provided from the input sensors 122 to the prediction algorithm 210; and a trailer hitch angle 208 is similarly provided vi the rear camera 126(2) from the vehicle 100.

In addition, in various embodiments, the lane information 202, vehicle speed, acceleration, and yaw rate 204, the trailer dimensions 206, and the trailer hitch angle 208 are similarly provided to a path planner algorithm 212 for the trailer 101 and the vehicle 100.

In various embodiments, the prediction algorithm 210 processes the various sensor data (e.g. via the processor 142 of FIG. 1) in order to generate predictions as to when the vehicle 100 and/or trailer 101 are expected to cross lane markings, and as such to provide appropriate warnings 214 via a driver notification 216 when such lane marking crossings are imminent.

Also in various embodiments, the prediction algorithm 210 also provides lane crossing confidence levels 218 for use, in combination with intervention criteria of the prediction algorithm 210, and providing activation commands 220. Also in various embodiments, the path panning algorithm 212 utilizes the sensor data for generating an optimal trajectory 221 for the vehicle and trailer. In various embodiments, the optimal trajectory 221 is utilized in combination with the activation command 220 for exercising lane keeping control 222, including first control commands 224 for the steering system 108 of FIG. 1 and second control commands 226 for the braking systems 106 and/or 168 of FIG. 1.

Figure 3:
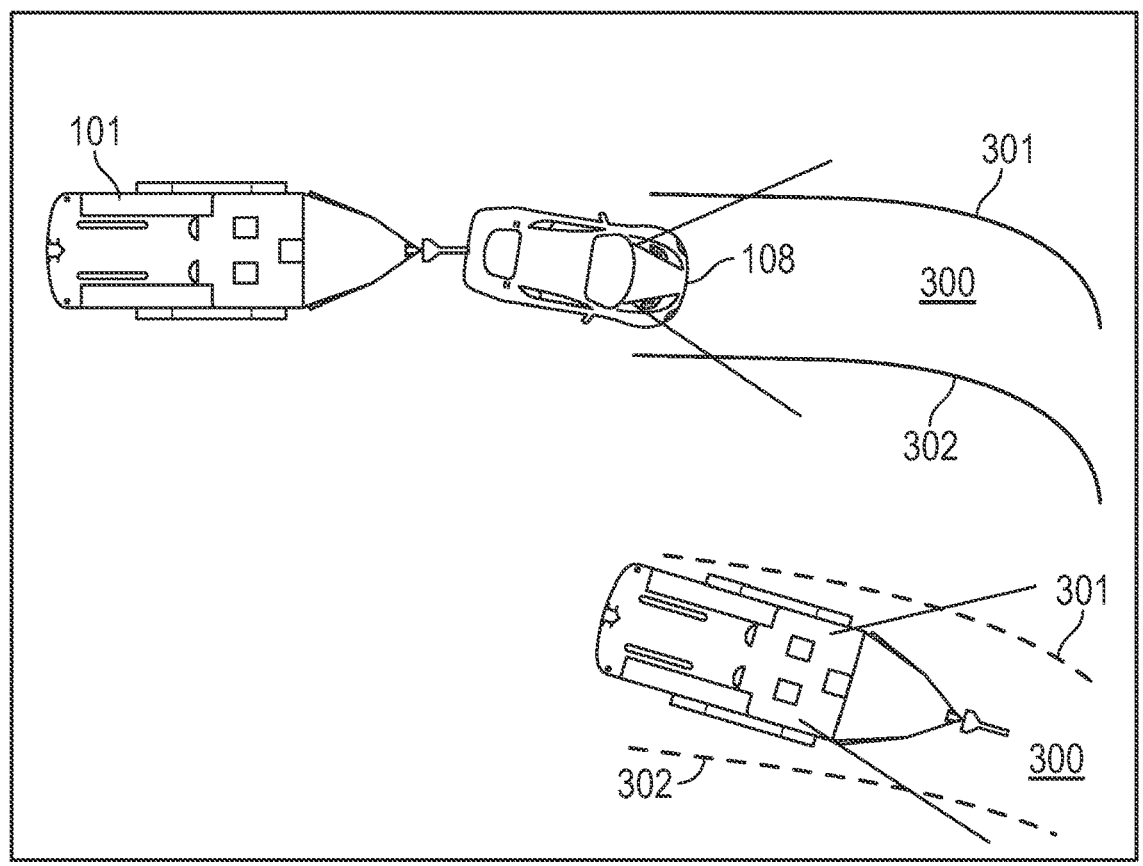
FIGS. 3 and 4 depicts of the vehicle and trailer of FIG. 1 as depicted during travel along a lane of a roadway, in accordance with exemplary embodiments.
Figure 4:
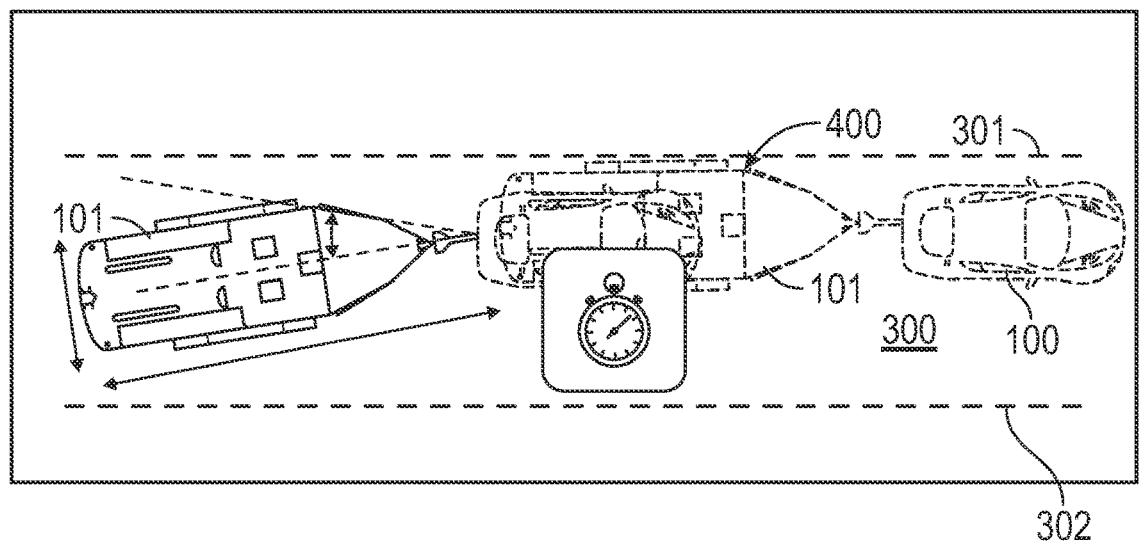

FIGS. 3 and 4 depict the vehicle 100 and trailer 101 in a lane 300 of a roadway on which the vehicle 100 and trailer 101 are travelling, in accordance with an exemplary embodiment. Also as depicted in FIGS. 3 and 4, the lane 300 includes lane markings 301, 302 which the vehicle 100 and trailer 101 could cross, in an exemplary embodiment.

As shown in FIG. 3, the lane markings 301, 302 are sensed by the vehicle 100 (e.g., by one or more cameras 126 thereof) at a particular point in time (e.g., referred to herein as "time k"). Also as shown in FIG. 3, the lane markings 301, 302 are virtually reconstructed for the trailer at a subsequent point in time (e.g., "time k+1") using the camera data from the vehicle 100, in order to effectively localize the trailer 101 within the lane 300.

In addition, as shown in FIG. 4, these techniques are utilized in order to estimate a time to lane crossing at which the trailer 101 contacts one of the lane markings 301, e.g., depicted with point 400 in FIG. 4.

Figure 5:
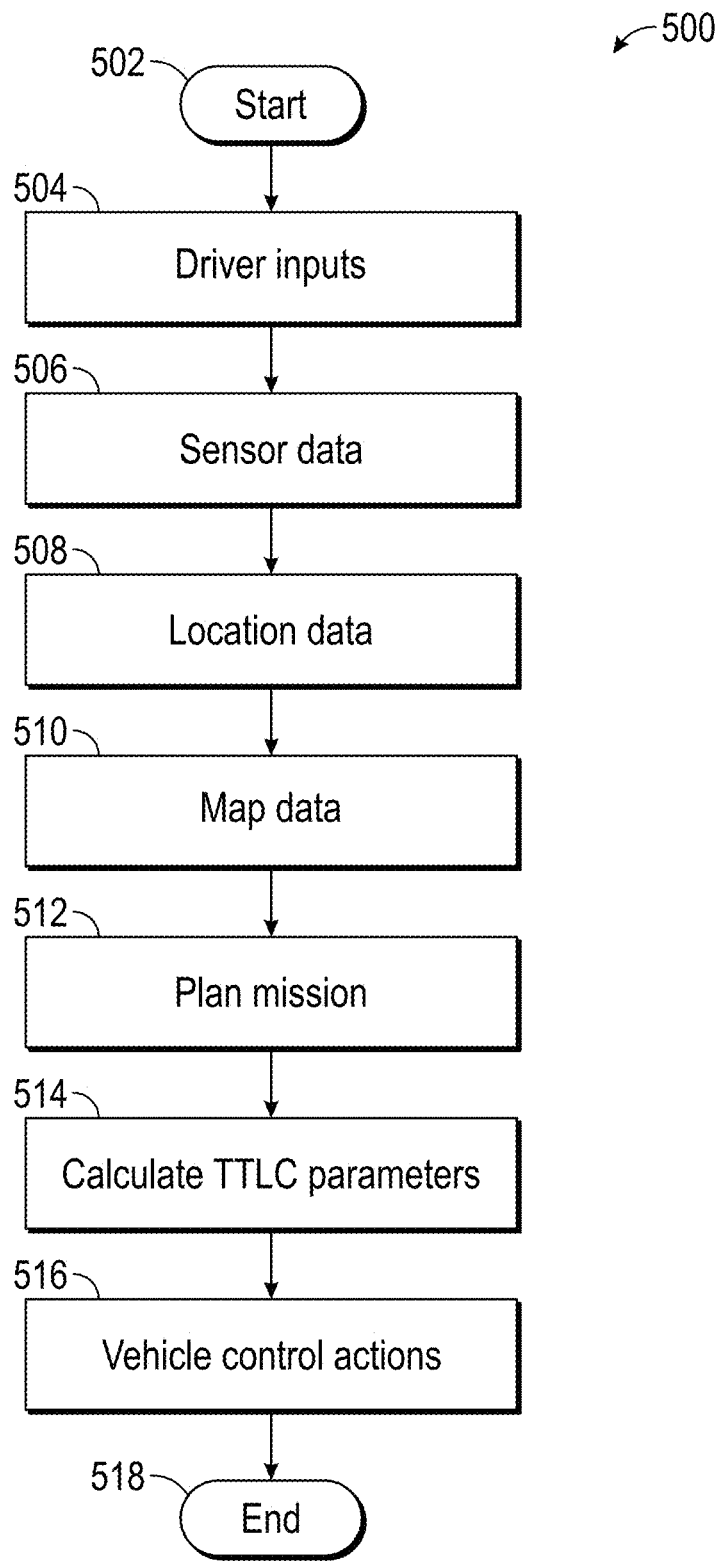
FIG. 5 is a flowchart of a process for controlling the vehicle and trailer of FIG. 1 with respect to a lane of a roadway, such as that depicted in FIGS. 3 and 4, in accordance with exemplary embodiments.

With reference to FIG. 5, a flowchart is provided of a process 500 for controlling the vehicle 100 and trailer 101 of FIG. 1 with respect to a lane of a roadway, such as that depicted in FIGS. 3 and 4, in accordance with exemplary embodiments.

As depicted in FIG. 5, the process 500 begins at step 502. In one embodiment, the process 500 begins when a vehicle drive or ignition cycle begins, for example when a driver approaches or enters the vehicle 100, or when the driver turns on the vehicle and/or an ignition therefor (e.g. by turning a key, engaging a keyfob or start button, and so on). In one embodiment, the steps of the process 500 are performed continuously during operation of the vehicle.

User inputs are generated for the vehicle (step 504). In various embodiments, the user inputs are obtained from a driver or other user of the vehicle 100 via inputs sensors 122 of FIG. 1. In various embodiments, the user inputs include a destination of travel for the vehicle 100 for the current vehicle drive. In addition, in certain embodiments, the user inputs may also include one or more other user requests pertaining to the vehicle drive, such as a preference as to a route or type of route for the vehicle drive, an override of one or more automated features of the vehicle 100, and so on. In certain embodiments, the user inputs are inputted by the driver or other user of the vehicle 100 via one or more buttons, switches, knobs, touch screens, microphones, and/other devices of the vehicle 100, for example as part of the location system 130 of FIG. 1 (e.g., in certain embodiments, as part of a navigation system and/or GPS system, or the like). In various embodiments, the user inputs of step 504 is provided to the processor 142 of FIG. 1 for processing, and for making determinations and implementation the remaining steps of the process 500, for example as described below.

Also in certain embodiments, additional sensor data is obtained (step 506). In various embodiments, sensor data is obtained with respect to the vehicle 100 and/or a roadway or path on which the vehicle 100 is travelling, via one or more cameras 126, speed sensors 125, acceleration sensors 127, yaw sensors 128, trailer sensors 124, cameras 126, and/or other sensors of the sensor array 120 of FIG. 1, and/or in certain embodiments the sensors 164 of the trailer 101 of FIG. 1. In various embodiments, the sensor data of step 504 is provided to the processor 142 of FIG. 1 for processing, and for making determinations and implementation the remaining steps of the process 500, for example as described below.

Location data is obtained for the vehicle (step 508). In various embodiments, location data is obtained via the location system 130 of FIG. 1 (e.g., a GPS system) pertaining to a location of the vehicle 100. In certain embodiments, such location information is obtained using information from one or more satellites, and includes longitudinal and latitudinal coordinates for the vehicle 100. In various embodiments, the location data of step 508 is provided to the processor 142 of FIG. 1 for processing, and for making determinations and implementation the remaining steps of the process 500, for example as described below.

Map data is also obtained for the vehicle drive (step 510). In various embodiments, lane level map data is obtained for the roadway or path on which the vehicle 100 is travelling, including the lane markings for the lane. In various embodiments, the map data is retrieved from one or more map data 154 stored in the memory 144 of FIG. 1 corresponding to the lane and roadway or path on which the vehicle 100 is travelling, based on the location data of step 508.

A mission is planned for the vehicle (step 512). In various embodiments, a mission (or path of travel) for the vehicle 100 is planned in order to reach the destination of the current vehicle drive in accordance with the user inputs of step 504. In various embodiments, the mission is determined by the processor 142 of FIG. 1 to include the roadway(s) and lane(s) of travel within the roadway(s) in order to reach the destination as selected by the user. In certain embodiments, the location data of step 508 and/or the map data of step 510 are also utilized by the processor 142 is selecting the mission.

In various embodiments, the mission planning of step 512 includes a merging of blended path candidates for both the vehicle 100 and the trailer 101 with respect to a centerline 1201 of the lane 300 in which the vehicle 100 and trailer 101 are travelling, as described in greater detail below in connection with FIGS. 12-14.

Figure 12:
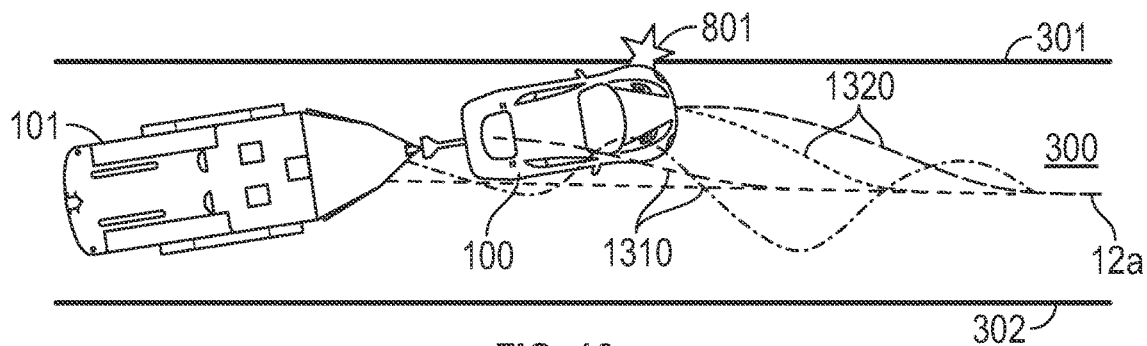
Figure 13:
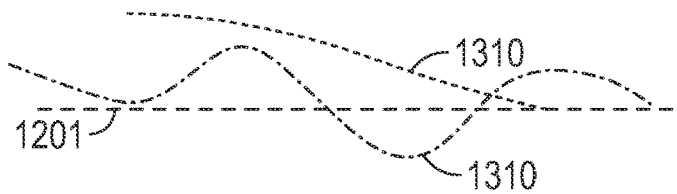
Figure 14:
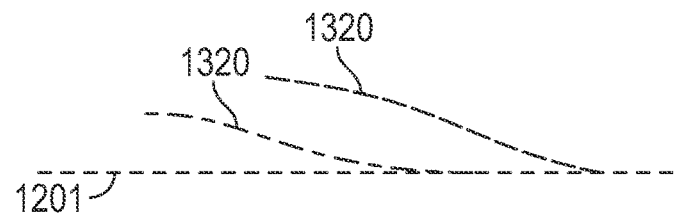

Specifically, as depicted in FIGS. 12-14, in certain embodiments different blended path candidates are generated and analyzed, in accordance with the discussion above. For example, in an exemplary embodiment, a first blended path candidate 1310 is generated by blending a trailer path with a centerline 1201 of the lane 300, as depicted in FIGS. 12 and 13. By way of additional example, a second blending path candidate 1320 is generated by blending a vehicle path with the centerline 1201 of the lane 300, as depicted in FIGS. 12 and 14.

In various embodiments, the processor 142 of FIG. 1 makes a determination as to which of the blended path candidates 1310 or 1320 is optimal. For example, in the depicted example of FIGS. 12-14, both of the blended path candidates 1310 and 1320 satisfy motion constraint metrics for the vehicle 100. However, in this example, only the second blended path candidate 1320 satisfied trailer 101 motion constrains (e.g., as to lateral acceleration, lateral velocity, and yaw), as the first blended path candidate 1310 was not sufficiently smooth respect to the centerline 1201. Accordingly, in this example, the first blended path candidate 1310 would be rejected, and the second blended path candidate 1320 would be utilized as the path for the vehicle 100 and the trailer 101 to follow.

In various embodiments, the blended path candidates 1310 and/or 1320 (e.g., whichever is selected) is utilized for optimal path planning design for the both the host vehicle 100 and the trailer 101.

With reference back to FIG. 5, time to crossing parameters are calculated (step 514). In various embodiments, time to lane crossing ("TTLC") values are calculated for both the vehicle 100 and the trailer 101 with respect to lane markers of the lane of the roadway in which the vehicle 100 and the trailer 101 are travelling. In certain embodiments, the TTLC values comprise respective amounts of time after which the vehicle 100 and the trailer 101 would be expected to cross the lane markers if the vehicle 100 and the trailer 101 were to continue along their current trajectories. In various embodiments, these determinations and calculations are made by the processor 142 of FIG. 1, and are utilized for vehicle and trailer control during step 516 (described further below).

Figure 6:
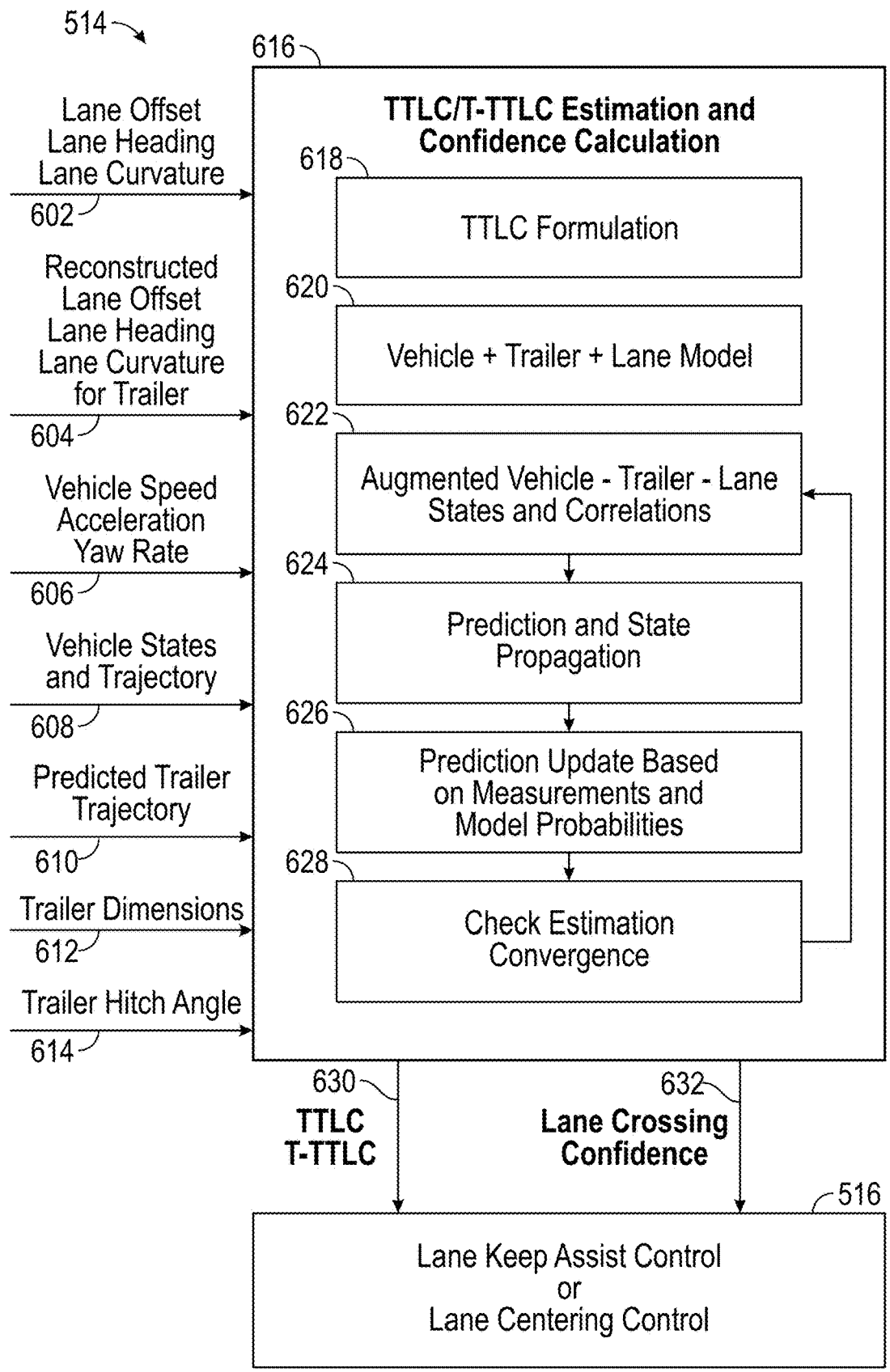
FIG. 6 is a flowchart of a sub-process of the process of FIG. 5, namely, for determining time to lane crossing parameters, in accordance with an exemplary embodiment.

With reference to FIG. 6, a sub-process for step 514, the calculating of the time to crossing parameters, is depicted in accordance with an exemplary embodiments. As depicted in FIG. 6, various inputs are used for the calculations, including: lane offset, lane heading, and lane curvature inputs 602, reconstructed lane offset, lane heading, and lane curvature for the trailer inputs 604, vehicle speed, acceleration, and yaw rate inputs 606, vehicle states and trajectory inputs 608, predicted trailer trajectory inputs 610, trailer dimensions 612, and a trailer hitch angle 614. In various embodiments, these inputs are obtained via various sensors of the sensor array 120 of the vehicle 100 of FIG. 1, and/or in certain embodiments also from the trailer sensors 164 of the trailer 101 of FIG. 1. Also in various embodiments, these inputs are utilized for making TTLC estimates at combined step 616, as described further below.

With reference to FIGS. 8-11, in various embodiments, the lane various inputs (including of inputs 604) including a reconstruction of lane markings for the trailer using sensed lane lines by the vehicle camera and/or map.

In various embodiments, a lane geometry is sensed by one or more cameras 126 of the vehicle 100 of FIG. 1, and/or using map data from FIG. 1, in accordance with the following equation:

$$y_i(x_i) = C_0 + C_1 x_i + C_2 x_i^2 + C_3 x_i^3 \qquad \text{(Equation 1)}$$

in which $y_i$ represents lateral coordinate of the lane marking point i from the perspective of the vehicle 100, $x_i$ is the longitudinal distance of the lane marking point i from the vehicle, and C coefficients are geometric constants which are updated at different points in time as the vehicle 100 travels along the lane.

Also in various embodiments, this lane geometry is also transformed to the perspective of the trailer 101 using trailer dimensions, hitch angle, and host vehicle variables (e.g., as obtained via sensor data as described above), and using, as inputs, lane information from the vehicle perspective, a historical buffer of lane information, the trailer dimensions and hitch angle, and host vehicle odometry parameters (including steering angle, inertial measurement data, vehicle velocity, vehicle wheel speeds, satellite-based location data such as from GPS, and wheel speeds).

In various embodiments, the trailer 101 is localized within the lane using historical camera lane marking information, articulated vehicle dynamics, hitch angle and trailer dimensions (e.g., based on the sensor data and/or data stored in computer memory) without needing to add additional trailer lane sensing cameras to the trailer 101.

In various embodiments, the transformation is performed in accordance with the following equation:

$$\vec{R}_T^P \big|_k = \vec{R}_T^A \big|_k + \vec{R}_A^H \big|_k + \vec{R}_H^P \big|_k, \qquad \text{(Equation 2)}$$

in which $$\vec{R}_T^P|_k$$

(denoted as ray 802 in FIGS. 8-11) represents the lane from the trailer's perspective, $$\vec{R}_T^A|_k$$

(denoted as ray 804 in FIGS. 8-11) represents the articulation point on the trailer, $$\vec{R}_A^H|_k$$

(denoted as ray 806 in FIGS. 8-11—represents the orientation of the vehicle relative to the trailer at the articulation point, and $$\vec{R}_H^P|_k$$

(denoted as ray 808 in FIGS. 8-11 in FIGS. 8-11) represents the lane from the vehicle's perspective, and with further reference to point "P" 801 designated in FIGS. 8-11 as to when the vehicle and/or trailer are expected to cross one or more lane markers 301 of the roadway in which the vehicle and the trailer are travelling. Also depicted in FIG. 10 is a vector 810 representing $$\vec{R}_B^P|_k,$$

denoting a point on the external trailer profile, for example corresponding to tail end "B" 803 as depicted in FIGS. 8-11.

Also in various embodiments, the transformation continues in accordance with the following equation:

$$\vec{R}_T^P|_{k+t} = \vec{R}_T^A|_{k+t} + \vec{R}_A^H|_{k+t} + \vec{R}_H^P|_{k+t},\quad\text{(Equation 3)}$$

which estimates unknown values at time "k+t" at which time the vehicle camera data will not be directly capture images of crossing point "P" with the lane 300.

Also in various embodiments, the transformation continues in accordance with the following equations:

$$\vec{R}_H^H|_{k+t} + \vec{R}_H^P|_{k+t} = \vec{R}_H^P|_k \rightarrow \vec{R}_H^P|_{k+t} = \vec{R}_H^P|_k - \vec{R}_H^H|_{k+t}\quad\text{(Equations 4 and 5)}$$

$$\text{and } \vec{R}_T^P|_{k+t} = \vec{R}_T^A|_{k+t} + \vec{R}_A^H|_{k+t} + \vec{R}_H^P|_k - \vec{R}_H^H|_{k+t},\quad\text{(Equation 6)}$$

in which: (i)

$$\vec{R}_T^P|_{k+t}$$

(depicted as ray 1102 in FIG. 11) represents reconstructed lane points for the trailer from localization at time "k+t"; (ii)

$$\vec{R}_T^A|_{k+t}$$

(designated as ray 1104 in FIG. 11) represents values obtained via trailer geometry; (iii)

$$\vec{R}_A^H|_{k+t}$$

(designated as ray 1106 in FIG. 11) represents values obtained via hitch angle and vehicle geometry; (iv)

$$\vec{R}_H^P|_k$$

(designated as ray 1108 in FIG. 11) represents values sensed by the vehicle cameras at time "k"; and (v)

$$\vec{R}_H^H|_{k+t}$$

(designated as ray 1108 in FIG. 11) represents values obtained from vehicle odometry between times "k" and "k+t".

Also in various embodiments, the transformation may be applied for any arbitrary point on the trailer (such as tail end "B") in accordance with the following equation:

$$\vec{R}_B^P|_{k+t} = \vec{R}_B^T|_{k+t} + \vec{R}_T^P|_{k+t},\quad\text{(Equation 7)}$$

in which: (i)

$$\vec{R}_B^P|_{k+t}$$

represents the distance vector from the end of the trailer at point "B" to a point "P" on the lane marking 803 of FIGS. 8-11 at time "k+t" (e.g., similar to ray 810 of FIG. 8 but at time "k+t"); (ii)

$$\vec{R}_B^T|_{k+t}$$

represents the position of point "P" with respect to the trailer at time "k+t"; and (iii)

$$\vec{R}_T^P|_{k+t}$$

(designated with ray 1102 in FIG. 11) represents the reconstructed position vector of point "P" for the trailer perspective at time "k+t" (e.g., a front end of the trailer).

Figure 11:
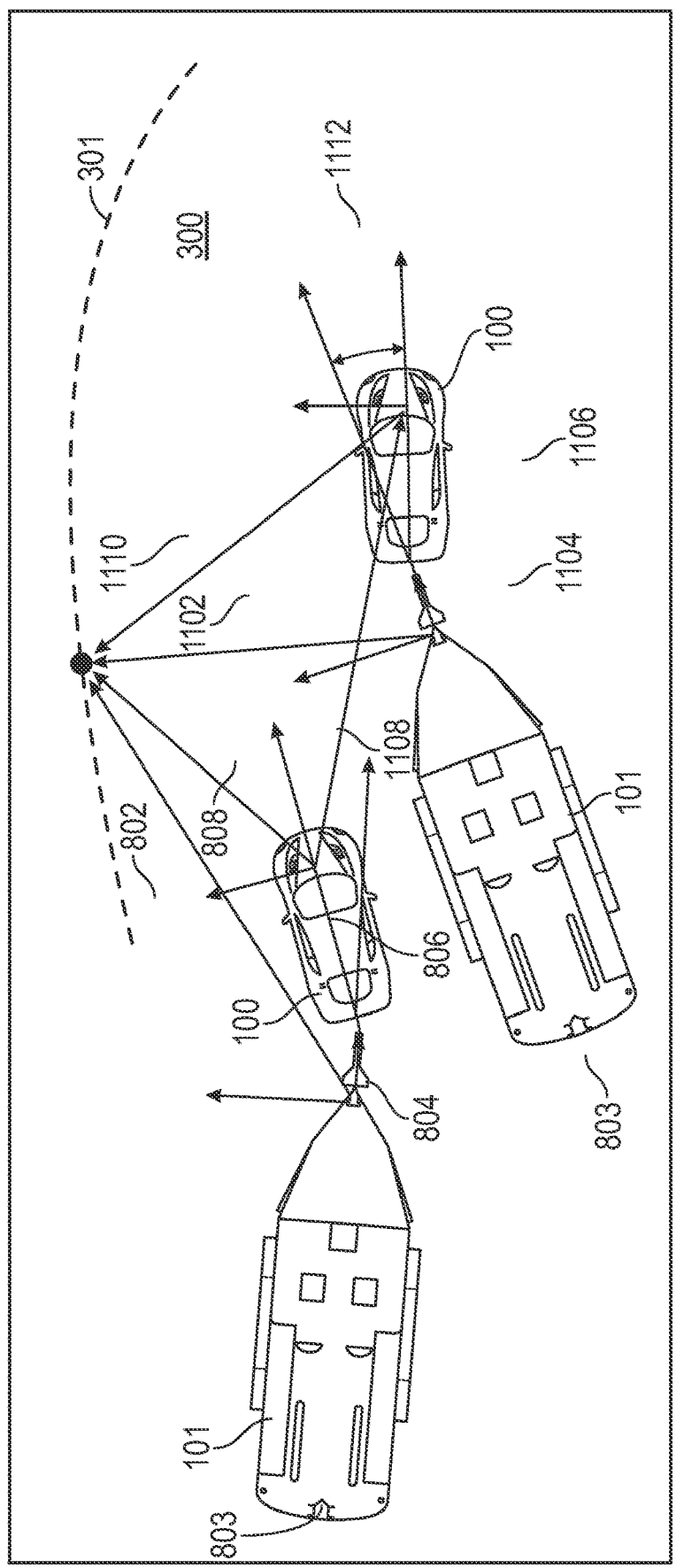

Also depicted in FIG. 11 is angle $\varphi_{k+t}$ (represented as angle 1112 in FIG. 11), representing an angle between the respective trajectories between the vehicle and the trailer, for example as utilized in additional equations that are presented below.

In addition, in various embodiments, the inputs of FIG. 6 further include a kinematic model in the coordinate attached to the vehicle 100. In certain embodiments the kinematic model considers vehicle acceleration (a), velocity (V), yaw rate ($\dot{\psi}$), hitch articulation angle (θ), wheelbase (L) and utilizes an assumption of negligible slip in generating the following equations:

$$\dot{x}_{Veh} = (at+V)\cos(\dot{\psi}t)$$

$$y_{Tra} = y_{Veh} L \sin\theta$$

$$\dot{x}_{Tra} = \dot{x}_{Veh} \sin\theta\dot{\theta}L$$

$$\dot{y}_{Tra} = \dot{y}_{Veh} + \cos\theta\dot{\theta}L \quad \text{(Equations 9-12)}$$

Further, in various embodiments, using a simplifying assumption that the constant velocity and yaw rate (and hitch angle rate of change) before lane marker crossing, the position of the vehicle is calculated using the following equations:

$$x_{Veh} = \frac{V}{\dot{\psi}}\sin(\dot{\psi}t) + \frac{a}{\dot{\psi}}t\sin(\dot{\psi}t) + \frac{a}{\dot{\psi}^2}\cos(\dot{\psi}t) - \frac{a}{\dot{\psi}^2} \quad \text{(Equations 13-16)}$$

$$y_{Veh} = \frac{y}{\dot{\psi}}\cos(\dot{\psi}t) + \frac{a}{\dot{\psi}}t\sin(\dot{\psi}t) - \frac{a}{\dot{\psi}^2}\sin(\dot{\psi}t) - \frac{v}{\dot{\psi}}$$

$$x_{Tra} = x_{Veh} - L\cos\theta$$

$$y_{Tra} = y_{Veh} + L\sin\theta.$$

Also in various embodiments, lane estimation in vehicle coordinates is represented by the cameras 126 using the following equation:

$$y_{Lane} = C_0 + C_1 l + C_2 l^2 + C_3 l^3 \quad \text{(Equation 17)}$$

in which "l" is the "look-ahead distance", and can be substituted by $x_{veh}$ from above, in accordance with the following equation:

(Equation 18)

$$y_{Lane} =$$

$$C_0 + C_1 \left(\frac{V}{\dot{\psi}}\sin(\dot{\psi}t) + \frac{a}{\dot{\psi}}t\sin(\dot{\psi}t) + \frac{a}{\dot{\psi}^2}\cos(\dot{\psi}t) - \frac{a}{\dot{\psi}^2} - L\cos\theta\right) +$$

$$C_2 \left(\frac{V}{\dot{\psi}}\sin(\dot{\psi}t) + \frac{a}{\dot{\psi}}t\sin(\dot{\psi}t) + \frac{a}{\dot{\psi}^2}\cos(\dot{\psi}t) - \frac{a}{\dot{\psi}^2} - L\cos\theta\right)^2 +$$

$$C_3 \left(\frac{V}{\dot{\psi}}\sin(\dot{\psi}t) + \frac{a}{\dot{\psi}}t\sin(\dot{\psi}t) + \frac{a}{\dot{\psi}^2}\cos(\dot{\psi}t) - \frac{a}{\dot{\psi}^2} - L\cos\theta\right)^3.$$

Also in various embodiments, the distance to lane crossing (DLC) can be defined in accordance with the following equation:

(Equation 19)

$$\Delta r_{Tra}(t) = y_{Tra} - y_{Lane} =$$

$$\frac{V}{\dot{\psi}}\cos(\dot{\psi}t) + \frac{a}{\dot{\psi}}t\sin(\dot{\psi}t) - \frac{a}{\dot{\psi}^2}\sin(\dot{\psi}t) - \frac{v}{\dot{\psi}} + L\sin\theta - C_0 -$$

$$C_1\left(\frac{V}{\dot{\psi}}\sin(\dot{\psi}t) + \frac{a}{\dot{\psi}}t\sin(\dot{\psi}t) + \frac{a}{\dot{\psi}^2}\cos(\dot{\psi}t) - \frac{a}{\dot{\psi}^2} - L\cos\theta\right) -$$

$$C_2\left(\frac{V}{\dot{\psi}}\sin(\dot{\psi}t) + \frac{a}{\dot{\psi}}t\sin(\dot{\psi}t) + \frac{a}{\dot{\psi}^2}\cos(\dot{\psi}t) - \frac{a}{\dot{\psi}^2} - L\cos\theta\right)^2 -$$

-continued $$C_3\left(\frac{V}{\dot{\psi}}\sin(\dot{\psi}t) + \frac{a}{\dot{\psi}}t\sin(\dot{\psi}t) + \frac{a}{\dot{\psi}^2}\cos(\dot{\psi}t) - \frac{a}{\dot{\psi}^2} - L\cos\theta\right)^3.$$

In addition, in certain embodiments, a second order Taylor expansion may be utilized around time t=0, in accordance with the following equation:

(Equation 20)

$$\Delta r_{Veh}(t) = L\sin\theta - C_0 -$$

$$C_1(Vt - L\cos\theta) - \left(C_2 V^2 + \frac{V\dot{\psi}}{2} + \frac{aC_1}{2} - L\cos\theta\right)t^2.$$

Accordingly, also in various embodiments, the second order approximation for the trailer time to lane crossing is generated using the following equation:

(Equation 21)

$$\Delta r_{Veh} = L\sin\theta - C_0 -$$

$$C_1(Vt_{TTLC} - L\cos\theta) - \left(C_2 V^2 + \frac{V\dot{\psi}}{2} - L\cos\theta\right)t_{TTLC}^2 =$$

$$0 \rightarrow t_{TTLC} = \frac{-b \pm \sqrt{(b^2 - 4dc)}}{2d},$$

in which "d", "b", and "c" are generating in accordance with the following equations:

$$d = \left(C_2 V^2 + \frac{V\dot{\psi}}{2} - L\cos\theta\right), \quad \text{(Equation 22)}$$

$$b = -C_1 V, \quad \text{(Equation 23)}$$

$$c = L\sin\theta - C_0 + C_1 L\cos\theta). \quad \text{(Equation 24)}$$

With continued reference to FIG. 6, in various embodiments the various inputs 602-614 are utilized in estimating the TTC parameters and respective confidence levels in combined step 616. In various embodiments, a time to lane crossing (TTLC) formulation is generated at step 618, for example as outline above.

Also in various embodiments, a model is generated at step 620 for the vehicle, trailer, and the lane in which the vehicle and lane are travelling, also in accordance with the discussion above.

Also in various embodiments, augmented vehicle and trailer lane states and correlations are generated at step 622, also in accordance with the discussion above.

Also in various embodiments, prediction and state propagation are generated at step 624, also in accordance with the discussion above.

Also in various embodiments, a prediction update is generated based on measurements (e.g., sensor data) and model probabilities at step 626, also in accordance with the discussion above.

In addition, also in various embodiments, estimation convergence is checked at step 628, also in accordance with the discussion above.

In various embodiments, the determinations above are utilized in determining "time to lane cross" values at step 630 with respect to both the vehicle 100 (i.e., "TTLC") and the trailer 101 (i.e., "T-TTLC"). In various embodiments, this is performed by the processor 142 of FIG. 1, in determining estimated amounts of time in which the vehicle 100 and the trailer 101 are to contact (or cross) the lane marker(s) provided that the vehicle 100 and the trailer 101 continue at their current trajectories.

Also in various embodiments, the determinations above are also utilized in determining respective levels of confidence in the TTLC and T-TTLC values at step 632. Also in various embodiments, this is performed by the processor 142 of FIG. 1.

As depicted in FIG. 6, the TTLC and T-TTLC values of step 630, and the confidence values of step 632, are both utilized by the processor 142 of FIG. 1 in controlling the vehicle 100 and/or trailer 101, for example in implementing lane keeping assist control, lane centering control, and/or one or more types of functionality for the vehicle 100 and the trailer 101 in accordance with step 516 of the process 500 of FIG. 5.

With reference back to step 516, vehicle control actions are taken. In various embodiments, the vehicle control actions include one or more control actions pertaining to a lane departure warning functionality (e.g., providing a notification to a user that the vehicle and/or trailer are about to cross a lane marker) and/or lane keep assist functionality (e.g., taking automatic braking, steering, and/or other control actions to help maintain the vehicle and the trailer within the appropriate lane). Specifically, in various embodiments, the processor 142 provides instructions for vehicle control commands the drive system 110, steering system 108, and/or vehicle braking system 106 and/or trailer braking system 168 of FIG. 1, based on time to lane crossing parameters determined in step 514. In various embodiments, the control actions are based on respective comparisons between vehicle time to lane crossing (TTLC) and trailer time to lane crossing (T-TTLC) and respective threshold values for the vehicle 100 and the trailer 101 (e.g., as stored in the memory 144 of FIG. 1 as stored values thereof), and for example as described below in connection with an exemplary embodiment of this step 516 as depicted in FIGS. 7 and 8.

Figure 7:
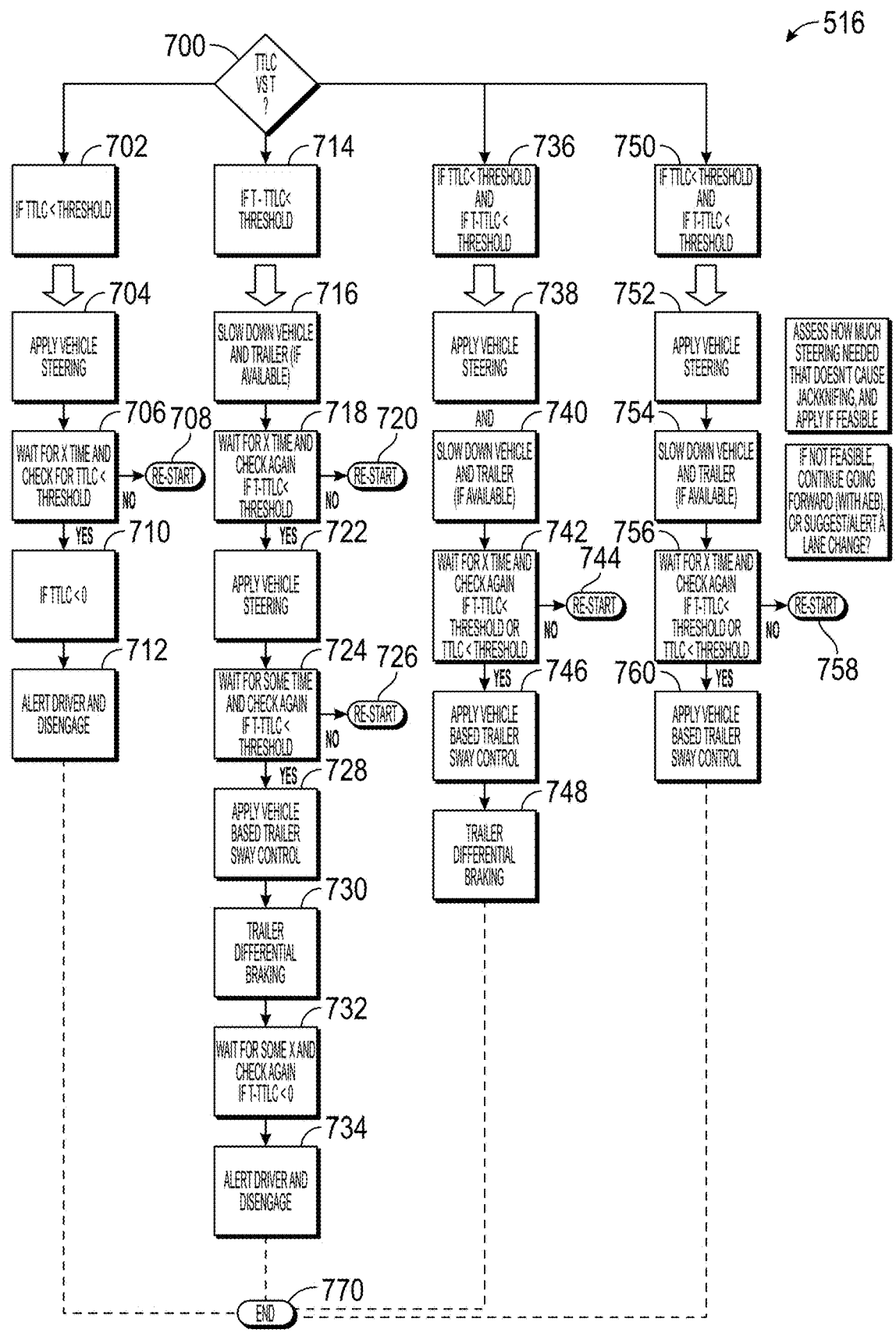
FIG. 7 is a flowchart of another sub-process of the process of FIG. 5, namely, for exercising vehicle control based on the time to lane crossing parameters, in accordance with exemplary embodiments.

With reference to FIG. 7, an exemplary embodiment is depicted with respect to step 516 of the process 500 of FIG. 5. As illustrated in FIG. 7, in an exemplary embodiment, step 516 begins with comparisons of the TTLC and T-TTLC values with the respective thresholds of the vehicle 100 and the trailer 101. The steps of FIG. 7 are also described below in connection with an exemplary implementation depicted in FIG. 15, which shows different possible outcomes with respect to the TTLC and T-TTLC values and the respective vehicle and trailer thresholds.

In an exemplary embodiment, when the TTLC value is less than a respective vehicle threshold but the T-TTLC value is greater than or equal to a respective trailer threshold, then the process proceeds to step 702. During step 702, it is determined that the vehicle, and not the trailer, is likely to cross a lane marker imminently (e.g., within a predetermined amount of time). In various embodiments, this corresponds to a first example 1501 depicted in FIG. 15, in which the vehicle 100, but not the trailer 101, is expected to cross a lane marker 301 under current trajectories.

Accordingly, in an exemplary embodiment, a steering correction is applied to the vehicle at step 704. In an exemplary embodiment, the processor 142 of FIG. 1 provides instructions to the steering system 108 of FIG. 1 so as to help the vehicle 100 to avoid crossing the lane markers of the roadway in which the vehicle 100 is travelling.

Also in certain embodiments, a timer is utilized at step 706. In an exemplary embodiment, the process waits for a certain amount of time (e.g., "x" amount of time), and checks again to determine whether the TTLC value is still less than the vehicle threshold. If it is determined after the amount of time that the TTLC value is now greater than or equal to the vehicle threshold, then the process re-starts at step 708 (e.g., by returning to step 700 in certain embodiments). Conversely, if it is determined after the amount of time that the TTLC is still less than the vehicle threshold, then the process proceeds instead to step 710, described directly below.

In various embodiments, during step 710, a determination is made as to whether the TTLC value is less than zero. In an exemplary embodiment once it is determined that the TTLC value is less than zero, then an alert is provided to the driver (e.g., an audio, visual, and/or haptic alert provided by the display system 135 of FIG. 1 in accordance with instructions provided by the processor 142 of FIG. 1), and the process disengages the automatic steering from step 704 (e.g., to allow the driver or user to take over steering, in certain embodiments). In various embodiments, the process then terminates at step 770.

With reference back to step 700, in certain embodiments, when the T-TTLC value is less than a respective trailer threshold but the TTLC value is greater than or equal to a respective vehicle threshold, then the process proceeds to step 714. During step 714, it is determined that the trailer, and not the vehicle, is likely to cross a lane marker imminently (e.g., within a predetermined amount of time). In various embodiments, this corresponds to a second example 1502 depicted in FIG. 15, in which the trailer 101, but not the vehicle 100, is expected to cross a lane marker 302 under current trajectories.

Accordingly, in an exemplary embodiment, a velocity of the vehicle 100 (and, if available, of the trailer 101) is reduced at step 716, in accordance with instructions provided by the processor 142 of FIG. 1 to the braking system 106 of FIG. 1 (and, in certain embodiments, to the braking system 168 of FIG. 1).

Also in certain embodiments, a timer is utilized at step 718. In an exemplary embodiment, the process waits for a certain amount of time (e.g., "x" amount of time), and checks again to determine whether the T-TTLC value is still less than the trailer threshold. If it is determined after the amount of time that the T-TTLC value is now greater than or equal to the trailer threshold, then the process re-starts at step 720 (e.g., by returning to step 700 in certain embodiments). Conversely, if it is determined after the amount of time that the T-TTLC is still less than the trailer threshold, then the process proceeds instead to step 722, described directly below.

During step 722, a steering correction is applied to the vehicle 100. In an exemplary embodiment, the processor 142 of FIG. 1 provides instructions to the steering system 108 of FIG. 1 so as to help the trailer 101 to avoid crossing the lane markers of the roadway in which the trailer 101 is travelling.

Also in certain embodiments, a timer is again utilized at step 724. In an exemplary embodiment, the process waits for a certain amount of time (e.g., "x" amount of time), and checks again to determine whether the T-TTLC value is still less than the trailer threshold. If it is determined after the amount of time that the T-TTLC value is now greater than or equal to the trailer threshold, then the process re-starts at step 726 (e.g., by returning to step 700 in certain embodiments). Conversely, if it is determined after the amount of time that the T-TTLC is still less than the trailer threshold, then the process proceeds instead to step 728, described directly below.

In various embodiments during step 728, vehicle-based trailer sway control is applied. In various embodiments, the processor 142 of FIG. 1 provides instructions for the trailer sway control, for example to the steering system 108 and/or one or more systems of the trailer 101, in order to help keep the trailer 101 within its lane of travel.

Also in various embodiments during step 730, trailer differential braking is applied. In various embodiments, the processor 142 of FIG. 1 provides instructions for the trailer sway control, for example to the braking system 168 of the trailer 101 of FIG. 1, also in order to help keep the trailer 101 within its lane of travel.

In addition, in various embodiments, a timer is again utilized in step 732, and after waiting for a time (e.g., a time "x"), a determination is made during step 732 as to whether the T-TTLC value is less than zero. In an exemplary embodiment once it is determined that the T-TTLC value is less than zero, then an alert is provided to the driver (e.g., an audio, visual, and/or haptic alert provided by the display system 135 of FIG. 1 in accordance with instructions provided by the processor 142 of FIG. 1), and the process disengages the automatic control functions of steps 722, 728, and 730 (e.g., to allow the driver or user to take over control, in certain embodiments). In various embodiments, the process then terminates at step 770.

With reference back to step 700, in certain embodiments, when the TTLC and T-TTLC values are both less than their respective vehicle and trailer thresholds, and further provided that the vehicle and trailer are heading toward crossing lane markers on the same side of the lane (e.g., the same marker 301 or 302 of FIG. 150), then the process proceeds to step 736. During step 736, it is determined that the vehicle and the trailer are both believed to cross the same lane marker imminently (e.g., within a predetermined amount of time). In various embodiments, this corresponds to a third example 1503 depicted in FIG. 15, in which the vehicle 100 and the trailer 101 are both expected to cross the same lane marker 301 under current trajectories.

Accordingly, in an exemplary embodiment, during step 738, a steering correction is applied to the vehicle 100. In an exemplary embodiment, the processor 142 of FIG. 1 provides instructions to the steering system 108 of FIG. 1 so as to help both the vehicle 100 and the trailer 101 to avoid crossing the lane markers of the roadway in which the vehicle 100 and trailer 101 are travelling.

Also in various embodiments, during step 740, a velocity of the vehicle 100 (and, if available, of the trailer 101) is reduced, in accordance with instructions provided by the processor 142 of FIG. 1 to the braking system 106 of FIG. 1 (and, in certain embodiments, to the braking system 168 of FIG. 1).

Also in certain embodiments, a timer is utilized at step 742. In an exemplary embodiment, the process waits for a certain amount of time (e.g., "x" amount of time), and checks again to determine whether the TTLC and T-TTLC values are still less than their respective vehicle and trailer thresholds. If it is determined after the amount of time that both the TTLC and T-TTLC values are greater than their respective thresholds, then the process re-starts at step 744 (e.g., by returning to step 700 in certain embodiments). Conversely, if it is determined after the amount of time that either TTLC or the T-TTLC, or both, are still less than their respective thresholds, then the process proceeds instead to step 746, described directly below.

In various embodiments during step 746, vehicle-based trailer sway control is applied. In various embodiments, the processor 142 of FIG. 1 provides instructions for the trailer sway control, for example to the steering system 108 and/or one or more systems of the trailer 101, in order to help keep the trailer 101 within its lane of travel.

Also in various embodiments during step 748, trailer differential braking is applied. In various embodiments, the processor 142 of FIG. 1 provides instructions for the trailer sway control, for example to the braking system 168 of the trailer 101 of FIG. 1, also in order to help keep the trailer 101 within its lane of travel.

In various embodiments, the process then terminates at step 770.

With reference back to step 700, in certain embodiments, when the TTLC and T-TTLC values are both less than their respective vehicle and trailer thresholds, and further provided that the vehicle and trailer are heading toward crossing lane markers on the opposite side of the lane (e.g., with one of the vehicle or trailer heading toward crossing a first lane marker 301 and the other of the vehicle or trailer heading toward crossing a second lane marker 302), then the process proceeds to step 750. During step 750, it is determined that the vehicle and the trailer are believed to cross opposite lane markers imminently (e.g., within a predetermined amount of time).

Accordingly, in an exemplary embodiment, during step 752, a steering correction is applied to the vehicle 100. In an exemplary embodiment, the processor 142 of FIG. 1 provides instructions to the steering system 108 of FIG. 1 so as to help both the vehicle 100 and the trailer 101 to avoid crossing the lane markers of the roadway in which the vehicle 100 and trailer 101 are travelling. Also in certain embodiments, during step 752, an assessment is provided as to how much steering control is needed that does not cause jackknifing, and this amount of steering control is provided if feasible. In addition, in certain embodiments, if this amount of steering is not feasible (e.g., if jackknifing would still likely result), then the process continues going forward with a current trajectory of travel for the vehicle and trailer, with a suggestion or alert for a lane change.

Also in various embodiments, during step 754, a velocity of the vehicle 100 (and, if available, of the trailer 101) is reduced, in accordance with instructions provided by the processor 142 of FIG. 1 to the braking system 106 of FIG. 1 (and, in certain embodiments, to the braking system 168 of FIG. 1).

Also in certain embodiments, a timer is utilized at step 756. In an exemplary embodiment, the process waits for a certain amount of time (e.g., "x" amount of time), and checks again to determine whether the TTLC and T-TTLC values are still less than their respective vehicle and trailer thresholds. If it is determined after the amount of time that both the TTLC and T-TTLC values are greater than their respective thresholds, then the process re-starts at step 758 (e.g., by returning to step 700 in certain embodiments). Conversely, if it is determined after the amount of time that either TTLC or the T-TTLC, or both, are still less than their respective thresholds, then the process proceeds instead to step 760, described directly below.

In various embodiments during step 760, vehicle-based trailer sway control is applied. In various embodiments, the processor 142 of FIG. 1 provides instructions for the trailer sway control, for example to the steering system 108 and/or one or more systems of the trailer 101, in order to help keep the trailer 101 within its lane of travel.

In various embodiments, the process then terminates at step 770.

Figure 15:
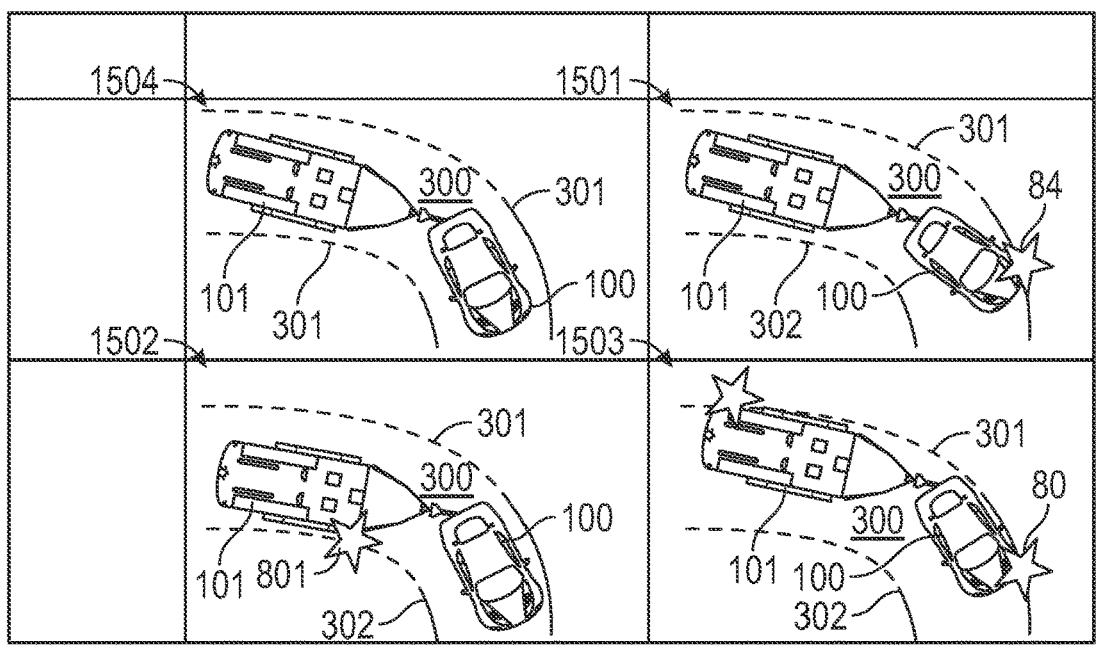

Finally, with continued reference to FIGS. 7 and 15, in certain embodiments, when it is determined that both the TTLC and T-TTLC values are greater than or equal to their respective vehicle and trailer parameters, then the above-described control actions are not deemed necessary (as neither the vehicle nor trailer are expected to imminently cross lane markings).

Accordingly, methods, systems, and vehicles are provided for control of vehicle/trailer systems. In various embodiments, a time to lane crossing for the vehicle (TTLC) and a time to lane crossing for the trailer (T-TTLC) are calculated based on various sensor data, location data, and map data. In various embodiments, the TTLC and T-TTLC values are compared with respective vehicle and trailer thresholds, and control of the vehicle and/or trailer are exercised in accordance with instructions provided by onboard processor of the vehicle when the vehicle and/or the trailer are deemed to be imminently cross one or more lane markers of a roadway on which the vehicle and the trailer are travelling.

It will be appreciated that the systems, vehicles, and methods may vary from those depicted in the Figures and described herein. For example, the vehicle 100 and/or trailer 101 of FIG. 1, the control system 102 of FIGS. 1 and 2, and/or components thereof of FIGS. 1 and 2 may vary in different embodiments. It will similarly be appreciated that the steps of the process 500 may differ from those depicted in FIG. 5, and/or that various steps of the process 500 may occur concurrently and/or in a different order than that depicted in FIG. 5. It will similarly be appreciated that the various implementations of FIGS. 2-15 may also differ in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   obtaining, at a first point in time, sensor data from one or more sensors onboard a vehicle that is towing a trailer within a lane of a roadway, the lane having one or more lane markers;
   virtually reconstructing, via a processor onboard the vehicle, lane markings for the trailer using lane markers sensed via the camera data, generating reconstructed lane markings, wherein the reconstructed lane markings are generated for a second point in time that is subsequent to the first point in time;
   calculating, via the processor onboard the vehicle, a time to lane crossing (T-TTLC) value for the trailer at which the trailer is expected to cross the reconstructed lane markings, using the sensor data from the one or more sensors onboard the vehicle from the first point in time; and
   controlling operation of the vehicle, the trailer, or both, via instructions provided by the processor, based on the calculated T-TTLC value.

2. The method of claim 1, wherein:
   the step of obtaining the sensor data comprises obtaining camera data from one or more cameras onboard the vehicle at the first point in time; and
   the step of calculating the T-TTLC value comprises calculating, via the processor, the T-TTLC value using the camera data.

3. The method of claim 2, wherein the step of calculating the T-TTLC value comprises:
   transforming the reconstructed lane markings, using additional sensor data, to a perspective of the trailer, generating transformed lane markings; and
   localizing the trailer within the transformed lane markings.

4. The method of claim 3, wherein the step of localizing the trailer comprises localizing the trailer within the transformed lane markers using historical camera lane marking information, articulated vehicle dynamics, hitch angle, and trailer dimensions, without needing to add additional trailer lane sensing cameras to the trailer.

5. The method of claim 3, wherein the step of calculating the T-TTLC value further comprises:
   blending, via the processor, blended paths of the trailer and the vehicle with a centerline of the lane of the roadway in which the vehicle and the trailer are travelling, and wherein the blending comprises:
   generating a first blended path candidate by blending a trailer path with a centerline of the lane; and
   generating a second blended path candidate by blending a vehicle path with the centerline of the lane.

6. The method of claim 5, wherein the blended paths are utilized for optimal path planning design for the both the vehicle and the trailer based on whether the first blended candidate, the second blended candidate, or both satisfy motion constraint metrics as to lateral acceleration, lateral velocity, and yaw for the trailer and the vehicle, respectively.

7. The method of claim 1, further comprising:
   calculating, via the processor, a time to lane crossing (TTLC) value for the vehicle, using the sensor data from the one or more sensors onboard the vehicle;
   wherein the step of controlling operation of the vehicle, the trailer, or both comprises controlling operation of the vehicle, the trailer, or both, via instructions provided by the processor, based on both the calculated T-TTLC value and the calculated TTLC value.

8. The method of claim 7, wherein the step of controlling operation of the vehicle, the trailer, or both comprises controlling operation of both the vehicle and the trailer, via instructions provided by the processor, based on both the calculated T-TTLC value and the calculated TTLC value.

9. The method of claim 1, wherein the step of controlling operation of the vehicle, the trailer, or both, comprises providing a notification to a user that the vehicle, the trailer, or both are expected to cross one or more lane markers under current trajectories.

10. The method of claim 1, wherein the step of controlling operation of the vehicle, the trailer, or both, comprises providing one or more control actions, via instructions provided by the processor, to keep the vehicle, the trailer, or both within a lane of travel, based on the T-TTLC value.

11. The method of claim 1, wherein the step of controlling operation of the vehicle, the trailer, or both, comprises providing corrective steering, corrective braking, or both, via instructions provided by the processor, based on the T-TTLC value.

12. A system comprising:
one or more sensors configured to at least facilitate obtaining sensor data at a first point in time from onboard a vehicle that is towing a trailer within a lane of a roadway, the lane having one or more lane markers; and
a processor onboard the vehicle and configured to at least facilitate:
virtually reconstructing lane markings for the trailer using lane markers sensed via the camera data, generating reconstructed lane markings, wherein the reconstructed lane markings are generated for a second point in time that is subsequent to the first point in time;
calculating a time to lane crossing (T-TTLC) value for the trailer at which the trailer is expected to cross the reconstructed lane markings, using the sensor data from the one or more sensors onboard the vehicle from the first point in time; and
controlling operation of the vehicle, the trailer, or both based on the calculated T-TTLC value.

13. The system of claim 12, wherein:
the one or more sensors comprise one or more cameras configured to generate camera data at the first point in time; and
the processor is further configured to at least facilitate calculating the T-TTLC value using the camera data.

14. The system of claim 13, wherein the processor is further configured to at least facilitate:
transforming the reconstructed lane markings, using additional sensor data, from a perspective of the trailer; and
localizing the trailer within the transformed lane markings.

15. The system of claim 14, wherein the processor is further configured to at least facilitate controlling the vehicle by blending paths of the trailer and the vehicle with a centerline of the lane of the roadway in which the vehicle and the trailer are travelling, and wherein the blending comprises:
generating a first blended path candidate by blending a trailer path with a centerline of the lane; and
generating a second blended path candidate by blending a vehicle path with the centerline of the lane.

16. The system of claim 12, wherein the processor is further configured to at least facilitate:
calculating a time to lane crossing (TTLC) value for the vehicle, using the sensor data from the one or more sensors onboard the vehicle; and
controlling operation of the vehicle, the trailer, or both, based on both the calculated T-TTLC value and the calculated TTLC value.

17. The system of claim 16, wherein the processor is further configured to at least facilitate controlling operation of both the vehicle and the trailer based on both the calculated T-TTLC value and the calculated TTLC value.

18. The system of claim 12, wherein the processor is configured to at least facilitate providing corrective steering, corrective braking, or both, to keep the vehicle, the trailer, or both within a lane of travel, based on the T-TTLC value.

19. A vehicle configured to tow a trailer within a lane of a roadway, the lane having one or more lane markers; the vehicle comprising:
a body;
a propulsion system configured to generate movement of the body;
one or more sensors onboard the vehicle and configured to at least facilitate obtaining sensor data at a first point in time; and
a processor onboard the vehicle and configured to at least facilitate:
virtually reconstructing, via a processor onboard the vehicle, lane markings for the trailer using lane markers sensed via the camera data, generating reconstructed lane markings, wherein the reconstructed lane markings are generated for a second point in time that is subsequent to the first point in time;
calculating a time to lane crossing (T-TTLC) value for the trailer at which the trailer is expected to cross the reconstructed lane markings, using the sensor data from the one or more sensors onboard the vehicle from the first point in time; and
controlling operation of the vehicle, the trailer, or both based on the calculated T-TTLC value.

20. The vehicle of claim 19, wherein:
the one or more sensors comprise one or more cameras configured to generate camera data at the first point in time; and
the processor is further configured to at least facilitate calculating the T-TTLC value using the camera data, at least in part by:
transforming the reconstructed lane markings, using additional sensor data, from a perspective of the trailer, generating transformed lane markings; and
localizing the trailer within the transformed lane markings.

* * * * *